US009493042B2

(12) United States Patent
Gillen

(10) Patent No.: US 9,493,042 B2
(45) Date of Patent: Nov. 15, 2016

(54) METHOD OF VENTING A TIRE INFLATION SYSTEM AND CONTROL UNIT UTILIZED THEREIN

(71) Applicant: Dana Heavy Vehicle Systems Group, LLC, Maumee, OH (US)

(72) Inventor: Kurt P. Gillen, Lambertville, MI (US)

(73) Assignee: DANA HEAVY VEHICLE SYSTEMS GROUP, LLC, Maumee, OH (US)

(*) Notice: Subject to any disclaimer, the term of this patent is extended or adjusted under 35 U.S.C. 154(b) by 160 days.

(21) Appl. No.: 14/208,467

(22) Filed: Mar. 13, 2014

(65) Prior Publication Data

US 2015/0258863 A1    Sep. 17, 2015

Related U.S. Application Data

(60) Provisional application No. 61/791,158, filed on Mar. 15, 2013.

(51) Int. Cl.
*F16K 27/12* (2006.01)
*B60C 23/00* (2006.01)

(52) U.S. Cl.
CPC ............. *B60C 23/003* (2013.01); *F16K 27/12* (2013.01); *Y10T 137/36* (2015.04); *Y10T 137/7043* (2015.04)

(58) Field of Classification Search
CPC ............. Y10T 137/36; Y10T 137/7043; F16K 27/12; B60C 23/003
See application file for complete search history.

(56) References Cited

U.S. PATENT DOCUMENTS

| | | | | |
|---|---|---|---|---|
| 4,782,878 A | * | 11/1988 | Mittal | B60C 23/003 137/225 |
| 4,860,579 A | * | 8/1989 | Beverly | B60C 23/003 152/416 |
| 5,141,589 A | * | 8/1992 | Mittal | B60C 23/003 137/224 |
| 5,309,969 A | * | 5/1994 | Mittal | B60C 23/003 137/224.5 |
| 5,524,481 A | | 6/1996 | Claussen | |
| 6,561,017 B1 | | 5/2003 | Claussen | |
| 6,604,414 B1 | | 8/2003 | Claussen | |
| 6,666,078 B1 | | 12/2003 | Claussen | |
| 6,758,088 B2 | | 7/2004 | Claussen | |
| 6,865,930 B1 | | 3/2005 | Claussen | |
| 6,894,607 B1 | | 5/2005 | Claussen | |
| 7,051,585 B2 | | 5/2006 | Claussen | |
| 7,265,659 B2 | | 9/2007 | Claussen | |
| 7,437,920 B2 | | 10/2008 | Beverly | |
| 7,538,661 B2 | | 5/2009 | Claussen | |
| RE41,756 E | | 9/2010 | Claussen | |
| 2009/0084481 A1 | * | 4/2009 | Kalavitz | B60C 23/003 152/417 |

FOREIGN PATENT DOCUMENTS

DE    4009687 A1    10/1991
EP    0365953 A2    5/1990

* cited by examiner

*Primary Examiner* — Matthew W Jellett
(74) *Attorney, Agent, or Firm* — Marshall & Melhorn, LLC

(57) ABSTRACT

A method of venting a tire inflation system includes providing a housing and providing a first valve assembly within the housing. The first valve assembly venting a first fluid conduit disposed within the housing. A second valve assembly is provided and attached to the first fluid conduit. The second valve assembly venting a first fluid control circuit.

21 Claims, 1 Drawing Sheet

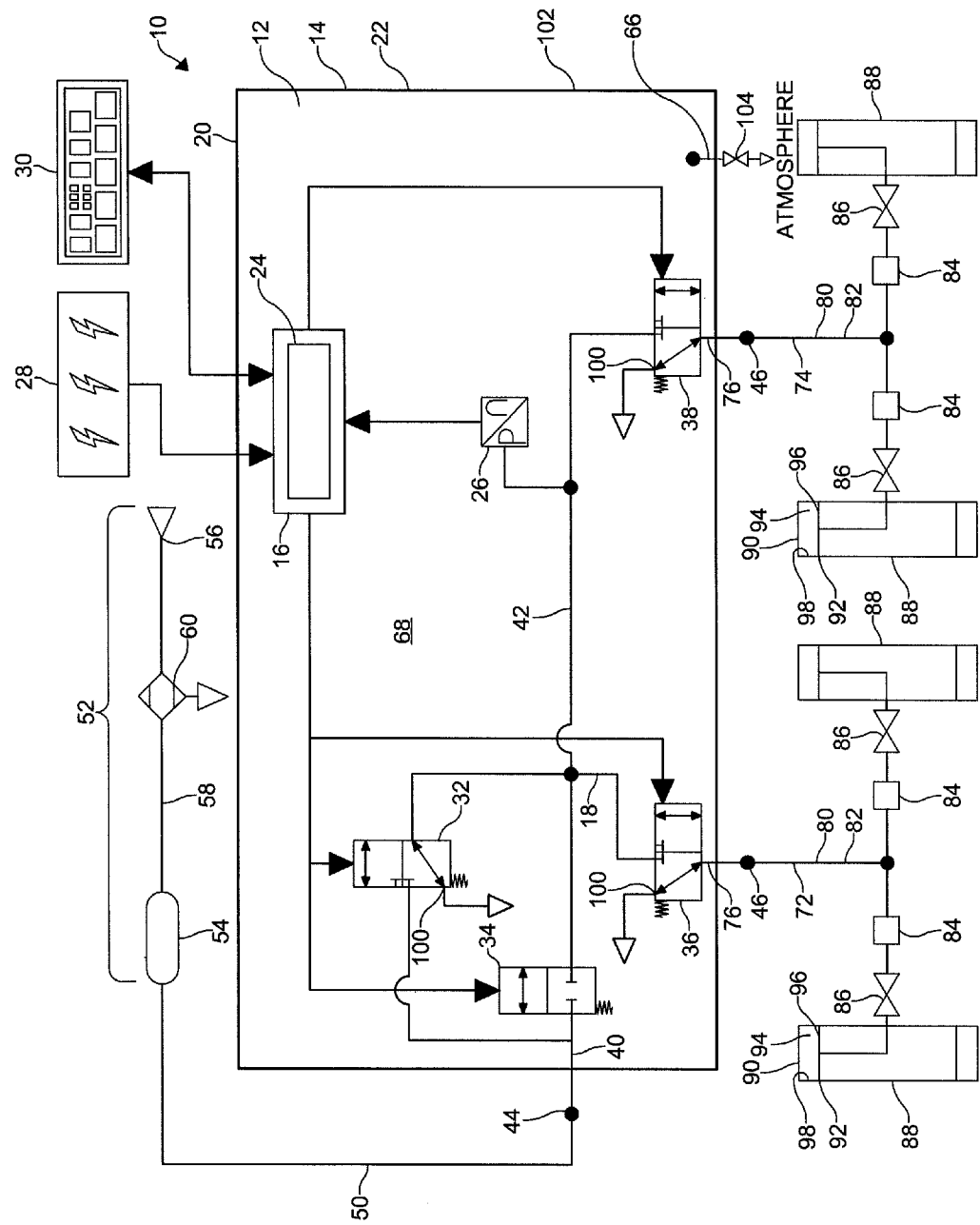

METHOD OF VENTING A TIRE INFLATION SYSTEM AND CONTROL UNIT UTILIZED THEREIN

CROSS-REFERENCE TO RELATED APPLICATIONS

This application is claiming the benefit, under 35 U.S.C. 119(e), of the provisional application granted Ser. No. 61/791,158 filed on Mar. 15, 2013, the entire disclosure of which is hereby incorporated by reference.

BACKGROUND OF THE INVENTION

The invention relates to a method for venting a tire inflation system. More particularly, the invention relates to a method of venting a central tire inflation system and the control unit utilized therein.

Certain types of vehicles such as, for example, commercial vehicles require that the tire pressure of their wheel assemblies be periodically adjusted for optimal performance. Tire pressure management systems such as, for example, central tire inflation systems can be utilized to manually and/or automatically adjust the pressure within one or more wheel assemblies. Typically, in order to determine when an adjustment is necessary and to avoid overinflation or underinflation, the tire pressure is measured. If, after measuring the tire pressure, it is determined that an adjustment is necessary the tire pressure management system enables the adjustment. After an adjustment has been made or it has been determined that an adjustment is not necessary, the system is typically vented to remove pressurized air therefrom by exposing the system to the atmosphere. However, exposure to the atmosphere may allow dirt and debris to enter the system which can cause system malfunctions during later operations.

Therefore, it would be advantageous to develop a method that allows the system to be vented and significantly reduces the likelihood that dirt and debris can enter the system during venting.

BRIEF SUMMARY OF THE INVENTION

A method of venting a tire inflation system is provided.

In an embodiment, the method comprises providing a housing and providing a first valve assembly within the housing. The first valve assembly venting a first fluid conduit disposed within the housing. A second valve assembly is provided and attached to the first fluid conduit. The second valve assembly venting a first fluid control circuit.

In another embodiment, the method comprises providing a housing. The housing comprises a chamber which is in fluid communication with the atmosphere via a passage formed in a lower portion of the housing. A first valve assembly is provided within the housing. The first valve assembly venting a first fluid conduit into the chamber. The first fluid conduit is located within the housing and is selectively in fluid communication with the chamber via the first valve assembly. A second valve assembly is provided within the housing and attached to the first fluid conduit. The second valve assembly is operable from an open position through a closed position, for respectively promoting fluid flow to one or more wheel assemblies via a first fluid control circuit or venting the first fluid control circuit into the chamber. A third valve assembly is provided within the housing. The third valve assembly is operable from an open position through a closed position, for respectively promoting and prohibiting fluid flow from a source of pressurized fluid to the first fluid control circuit via the first fluid conduit.

BRIEF DESCRIPTION OF THE DRAWINGS

The above, as well as other advantages of the present invention will become readily apparent to those skilled in the art from the following detailed description when considered in the light of the accompanying drawings in which:

FIG. 1 is a schematic view of an embodiment of a tire inflation system in accordance with the invention.

DETAILED DESCRIPTION OF THE INVENTION

It is to be understood that the invention may assume various alternative orientations and step sequences, except where expressly specified to the contrary. It is also to be understood that the specific assemblies, articles and features illustrated in the attached drawings, and described in the following specification are simply exemplary embodiments of the inventive concepts. Hence, specific dimensions, directions, or other physical characteristics relating to the embodiments disclosed are not to be considered as limiting, unless expressly stated otherwise. Also, although they may not be, like elements in various embodiments may be commonly referred to with like reference numerals within this section of the application.

A method of venting a tire inflation system is provided. Preferably, the method is utilized with a central tire inflation system (CTIS). Venting a tire inflation system or portions thereof is advantageous as it may increase the useful life of certain members of the tire inflation such as, for example, rotary seal assemblies.

Preferably, the tire inflation system is provided on a vehicle (not depicted). A preferred type of vehicle is a commercial vehicle. Commercial vehicles are known in the art. However, the method described herein may also have applications in vehicles for both light and heavy duty and for passenger and off-highway vehicles. Furthermore, it would be understood by one of ordinary skill in the art that the method could have industrial, locomotive, military and aerospace applications. Also, it should be appreciated that the method may be practiced prior to or during operation of the vehicle.

Tire inflation systems are configured to adjust tire pressure. Preferably, the method described herein is utilized with a tire inflation system which can increase and maintain tire pressure. However, the method described herein may also be utilized with a tire inflation system which can increase and decrease tire pressure. Also, the method will be described in connection with a fluid. For the purposes of describing the method, the fluid will hereinafter be referred to as air. However, alternative fluids are capable of being utilized in practicing the method.

An embodiment of a tire inflation system 10 is illustrated in FIG. 1. The tire inflation system 10 comprises a control unit 12. The control unit 12 is configured to enable determining the tire pressure of one or more wheel assemblies and, if needed, increasing the tire pressure thereof. The control unit 12 is also configured to enable venting of one or more portions of the tire inflation system 10.

The control unit 12 comprises a housing 14. An electronic control portion 16 and a pneumatic control portion 18 are provided within the housing 14. Preferably, the electronic control portion 16 is provided in an upper portion 20 of the housing 14. Preferably, the pneumatic control portion 18 is provided in a lower portion 22 of the housing 14.

The electronic control portion 16 may include a microprocessor 24 operating under the control of a set of programming instructions, which may also be referred to as software. The electronic control portion 16 may include a memory (not depicted) in which programming instructions are stored. The memory can also store identification codes, tire pressure records and/or user inputs over a period of time.

The electronic control portion 16 may receive input signals from a pressure sensor 26, power supply 28 and one or more additional sensors (not depicted) such as, for example, a load sensor and a speed sensor. The load sensor and speed sensor may each be conventional in the art. The pressure sensor 26 may also be referred to as a pressure transducer and will be discussed in greater detail below. The electronic control portion 16 may also receive input signals from an operator control device 30.

The operator control device 30 may allow an operator of the vehicle to exert a certain level of control over the tire inflation system 10. The operator control device 30 may be conventional in the art. The operator control device 30 permits an operator of the vehicle to transmit control signals to the electronic control portion 16 to adjust the tire pressure.

The electronic control portion 16 outputs signals to one or more members of the pneumatic control portion 18. Preferably, the electronic control portion 16 outputs signals to a plurality of valve assemblies 32, 34, 36, 38 of the pneumatic control portion 18. The output signals may be electrical current. Electrical current can be received by a valve assembly 32, 34, 36, 38 to place the assembly in an open position or a closed position, respectively. Similarly, electrical current can be removed from the valve assembly 32, 34, 36, 38 to place the assembly in an open position or a closed position, respectively. The electronic control portion 16 may also output signals to a display device (not depicted). The display device may be included as a part of the operator control device 30 or a freestanding device.

The pneumatic control portion 18 comprises one or more conduits 40, 42 provided within the housing 14 and one or more ports 44, 46 formed in the housing 14. In an embodiment, an air supply port 44 is formed in the lower portion 22 of the housing 14. On a side, the air supply port 44 is in fluid communication with an air supply conduit 40 provided within the housing 14. On an opposite side, the air supply port 44 is in fluid communication with an air supply circuit 50.

The tire inflation system includes a source of pressurized air 52. Pressurized air is supplied to control unit 12 from the source of pressurized air 52 via the air supply circuit 50. Preferably, the source of pressurized air 52 comprises a reservoir 54 such as, for example, a wet tank. Preferably, a compressor 56 is attached to the vehicle and in fluid communication with the wet tank via a supply conduit 58. The air compressor 56 supplies pressurized air to the wet tank for storage therein. In certain embodiments, a drier 60 is interposed in the air supply circuit 50 for removing water from the air. A filter (not depicted) may also be interposed in the air supply circuit 50.

The pressurized air is utilized to determine the tire pressure and, if needed, open one or more wheel valves 86 and increase the tire pressure. The pressurized air provided in the air supply circuit 50 and supplied from the source of pressurized air 52 comprises air at a certain pressure. The pressure sensor 26 measures the pressure of the pressurized air provided in the air supply circuit 50. It is preferred that at the time the method is practiced that the pressurized air provided in the air supply circuit 50 is at a pressure which is greater than the tire pressure. Preferably, the pressure of the pressurized air provided in the air supply circuit 50 is equal to or greater than the target tire pressure so that the tire pressure can, if needed, be increased to the target tire pressure. In an embodiment, the pressure of the air provided in the air supply circuit 50 is equal to the target tire pressure plus 5 psig or more.

The air supply conduit 40 is provided in and extends from the air supply port 44 into the lower portion 22 of the housing 14. An end of the air supply conduit 40 abuts the air supply port 44 and an opposite end abuts a passage 66 utilized for venting a chamber 68 formed within the housing 14. The air supply conduit 40 may have portions of different diameters. The diameter of the air supply conduit 40 generally decreases in size toward the passage 66. In an embodiment, a portion of the air supply conduit 40 adjacent the air supply port 44 is of a diameter which is greater than that of a portion adjacent the passage 66.

The air supply conduit 40 is attached to and in fluid communication with a control valve assembly 32, which may be referred to herein as "first valve assembly." Also, the air supply conduit 40 is attached to and in fluid communication with a supply valve assembly 34, which may be referred to herein as "third valve assembly." Preferably, the control valve assembly 32 and supply valve assembly 34 are of the solenoid variety. The control valve assembly 32 and the supply valve assembly 34 are operable from an open position through a closed position and provided within the housing 14. Preferably, the control valve assembly 32 and the supply valve assembly 34 are normally in the closed position.

The control valve assembly 32 is provided with an orifice which is smaller than that of the supply valve assembly 34. When the control valve assembly 32 is in the open position, the source of pressurized air 52 is in fluid communication with a first fluid conduit 42. When the source of pressurized air 52 and first fluid conduit 42 are in fluid communication via the control valve assembly 32, the assembly is utilized to communicate a small flow or bleed of air to the first fluid conduit 42 and/or a fluid control circuit 72, 74. When the control valve assembly 32 is in the closed position, the first fluid conduit 42 is in fluid communication with the chamber 68. When the first fluid conduit 42 is in fluid communication with the chamber 68 and if pressurized air is within the first fluid conduit 42, venting the first fluid conduit 42 occurs. The first fluid conduit 42 is vented by directing a flow of pressurized air from the first fluid conduit 42 through the control valve assembly 32 into the chamber 68.

When the supply valve assembly 34 is in the open position, the source of pressurized air 52 is in fluid communication with the first fluid conduit 42. When the source of pressurized air 52 and first fluid conduit 42 are in fluid communication, the supply valve assembly 34 is utilized to communicate a flow of air from the source of pressurized air 52 to the first fluid conduit 42. Thus, the supply valve assembly 34 is utilized to promote air flow from the source of pressurized air 52 to the first fluid conduit 42. In the closed position, the supply valve assembly 34 prohibits air flow from the source of pressurized air 52 to the first fluid conduit 42.

When the control valve assembly 32 and the supply valve assembly 34 are in the open position, the control valve assembly 32 and the supply valve assembly 34 are in fluid communication via the air supply conduit 40 and the first fluid conduit 42. Therefore, as noted above, when the control valve assembly 32 and the supply valve assembly 34 are in the open position, the source of pressurized air 52 is in fluid communication with the first fluid conduit 42. The pressure sensor 26 is provided within the housing 14 and is in fluid communication with the first fluid conduit 42. The pressure sensor 26 measures the pressure of the air within the first fluid conduit 42. Thus, when the source of pressurized air 52 is in fluid communication with the first fluid conduit 42, the pressure sensor 26 can measure the pressure of the air from the source of pressurized air 52 by measuring the pressure of the air in the first fluid conduit 42. Also, during certain operations, the pressure sensor 26 may measure the pressure of the air in a fluid control circuit 72, 74 by measuring the pressure of the air in the first fluid conduit 42. Once the pressure of the air in the first fluid conduit 42 has been measured, the pressure sensor 26 can send a signal to the electronic control portion 16.

As described above, the first fluid conduit 42 is in fluid communication with the pressure sensor 26, control valve assembly 32 and supply valve assembly 34. Also, as described above, the first fluid conduit 42 is selectively in fluid communication with the chamber 68. Preferably, the first fluid conduit 42 is provided in the lower portion 22 of the housing 14. The first fluid conduit 42 is also attached to and in fluid communication with one or more additional valve assemblies 36, 38.

As illustrated in FIG. 1, in certain embodiments, the pneumatic control portion 18 comprises two channel valve assemblies 36, 38. In these embodiments, a steer axle channel valve assembly 36, which may be referred to herein as "second valve assembly," and a drive axle channel valve assembly 38, which may be referred to herein as "fourth valve assembly," are each attached to and in fluid communication with the first fluid conduit 42. Preferably, the steer axle channel valve assembly 36 and drive axle channel valve assembly 38 are of the solenoid variety. The steer axle channel valve assembly 36 and the drive axle channel valve assembly 38 are operable from an open position through a closed position and provided within the housing 14. Preferably, the steer axle channel valve assembly 36 and the drive axle channel valve assembly 38 are normally in the closed position.

When the steer axle channel valve assembly 36 is in the open position, the first fluid conduit 42 is in fluid communication with a first fluid control circuit 72. Preferably, the first fluid control circuit 72 is capable of fluid communication with one or more wheel assemblies 88 provided on a steer axle (not depicted) of the vehicle. When the first fluid conduit 42 is in fluid communication with the first fluid control circuit 72, a flow of air from the source of pressurized air 52 can be directed to the wheel assemblies 88 provided on the steer axle via the first fluid control circuit 72. Thus, the steer axle channel valve assembly 36 is utilized to promote air flow from the source of pressurized air 52 to one or more wheel assemblies 88. When the steer axle channel valve assembly 36 is in the closed position, the first fluid control circuit 72 is in fluid communication with the chamber 68. When the first fluid control circuit 72 is in fluid communication with the chamber 68 and if pressurized air is within the first fluid control circuit 72, venting the first fluid control circuit 72 occurs. The first fluid control circuit 72 is vented by directing a flow of pressurized air from the first fluid control circuit 72 through the steer axle channel valve assembly 36 into the chamber 68.

When the drive axle channel valve assembly 38 is in the open position, the first fluid conduit 42 is in fluid communication with a second fluid control circuit 74. Preferably, the second fluid control circuit 74 is capable of fluid communication with one or more wheel assemblies 88 provided on a drive axle (not depicted) of the vehicle. When the first fluid conduit 42 is in fluid communication with the second fluid control circuit 74, a flow of air from the source of pressurized air can be directed to one or more wheel assemblies 88 provided on the drive axle via the second fluid control circuit 74. Thus, the drive axle channel valve assembly 38 is utilized to promote air flow from the source of pressurized air 52 to one or more wheel assemblies 88. When the drive axle channel valve assembly 38 is in the closed position, the second fluid control circuit 74 is in fluid communication with the chamber 68. When the second fluid control circuit 74 is in fluid communication with the chamber 68 and if pressurized air is within the second fluid control circuit 74, venting the second fluid control circuit 74 occurs. The second fluid control circuit 74 is vented by directing a flow of pressurized air from the second fluid control circuit 74 through the drive axle channel valve assembly 38 into the chamber 68.

The first fluid control circuit 72 and the second fluid control circuit 74 are similarly configured. Thus, only certain members of the first fluid control circuit 72 will be described in more detail below. It should be appreciated that as the first fluid control circuit 72 and the second fluid control circuit 74 are similarly configured, the tire inflation system 10 can utilize the fluid control circuits 72, 74 in similar fashions. For example, each fluid control circuit 72, 74 can be utilized to provide fluid communication between one or more wheel assemblies 88 and the control unit 12. Also, as described above, both the first fluid control circuit 72 and the second fluid control circuit 74 may be vented. The first fluid control circuit 72 and the second fluid control circuit 74 may be vented separately or simultaneously. Thus, certain operations of the tire inflation system 10 will only be described with respect to the first fluid control circuit 72. However, it should be appreciated that the tire inflation system 10 is not limited to utilizing only the first fluid control circuit 72 as described below in performing one or more of the operations described herein.

The first fluid control circuit 72 comprises a fluid conduit 76 and a channel port 46. The fluid conduit 76 is provided in the housing 14 and is attached to and in fluid communication with the steer axle channel valve assembly 36 on an end. On another end, the fluid conduit 76 is attached to and in fluid communication with the channel port 46.

The channel port 46 is formed in the housing 14. Preferably, the channel port 46 is formed in the lower portion 22 of the housing 14. The channel port 46 is attached to and in fluid communication with the fluid conduit 76 on a side thereof and a portion 80 of the fluid control circuit 72 which is provided outside of the housing 14 on an opposite side. The portion 80 of the fluid control circuit 72 which is provided outside of the housing 14 may comprise one or more additional fluid conduits 82, a rotary seal assembly 84 and/or a hose assembly (not depicted).

The channel port 46 is in fluid communication with one or more wheel valves 86 via the portion 80 of the fluid control circuit 72 which is provided outside of the housing 14. Preferably, each wheel valve 86 in fluid communication with the channel port 46 is similarly configured and operates in a similar fashion. As such, the configuration and operation of only one wheel valve 86 will be described below.

The wheel valve 86 is attached to a wheel assembly 88. The wheel valve 86 separates the fluid control circuit 72 from the wheel assembly 88 and is utilized to retain pressurized air therein. Also, the wheel valve 86 allows the wheel assembly 88 to selectively communicate with the control unit 12 via the fluid control circuit 72. Preferably, the wheel valve 86 is of the check valve variety.

Each wheel assembly 88 comprises a tire 90 and a wheel rim 92. The steer axle may be coupled to the wheel rim 92 of one or more wheel assemblies 88. Similarly, the drive axle may be coupled to the wheel rim 92 of one or more wheel assemblies 88. A space 94 is defined by an outer surface 96 of the wheel rim 92 and an inner surface 98 of the tire 90. The space 94 is configured to house pressurized air.

The pressurized air housed within the space 94 is referred to herein as "tire pressure." Tire pressure is increased by the addition of pressurized air into the space 94 and decreased by the removal of air from the space 94. Preferably, the tire pressure is equal to a target tire pressure. The target tire pressure can be selected by an operator of the vehicle to be a desired pressure. After the target tire pressure is selected, it can be programmed into the control unit 12 via the electronic control portion 16. The target tire pressure can also be pre-programmed into the control unit 12. To ascertain if the tire pressure is equal to the target tire pressure, the tire pressure is determined. As noted above, the control unit 12 is configured to enable determining the tire pressure. A preferred method of determining the tire pressure is described in U.S. patent application Ser. No. 61/912,640.

If it is determined that the tire pressure is less than the target tire pressure, the tire pressure can be increased. If it is determined that the tire pressure is greater than the target tire pressure, the tire pressure can be decreased. After the tire pressure has been increased and/or decreased, the tire pressure can be determined again as needed. Also, if the tire pressure is equal to the target tire pressure, the tire pressure can be determined again at a later time.

As noted above, the tire pressure is increased by the addition of pressurized air into the space 94 defined by the outer surface 96 of the wheel rim 92 and inner surface 98 of the tire 90. The tire pressure of a plurality of wheel assemblies 88 or exactly one wheel assembly 88 can be increased to the target tire pressure. Also, it should be appreciated that the tire pressure can be increased for the wheel assemblies 88 of the steer axle or drive axle. However, due to differences in the preferred target tire pressures of the wheel assemblies 88 of the steer axle and drive axle, it is preferred that the tire pressures of the wheel assemblies 88 of the aforementioned axles be increased separately.

When the tire pressure is to be increased, the wheel valve 86 is urged to an open position. Urging a wheel valve 86 to an open position will be discussed below with respect to one wheel valve 86 which is in fluid communication with the first fluid control circuit 72. It should be appreciated that the steps for urging the wheel valve 86 to an open position are applicable to additional wheel valves 86 in fluid communication with the first fluid control circuit 72. Similar steps may be taken for urging one or more wheel valves 86 in fluid communication with the second fluid control circuit 74 to an open position.

To open the wheel valve 86, the control valve assembly 32, supply valve assembly 34, and steer axle channel valve assembly 36 are in the open position so that the source of pressurized air 52 is in fluid communication with the wheel valve 86. Fluid communication between the source of pressurized air 52 and the wheel valve 86 is maintained for a predetermined time. Once the source of pressurized air 52 is in fluid communication with the wheel valve 86, a flow of pressurized air from the source of pressurized air 52 is directed through the supply conduit 40, control valve assembly 32, supply valve assembly 34, first fluid conduit 42 and first fluid control circuit 72 to the wheel valve 86 to urge the wheel valve 86 to an open position. The wheel valve 86 is urged to the open position due to the pressure difference between the pressure of the air supplied by the source of pressurized air 52 and the tire pressure. The wheel valve 86 may also be urged to a closed position when desired such as, for example, when the tire pressure has been increased to the target tire pressure.

Once the wheel valve 86 is in the open position, the tire pressure can be increased by any number of methods. For example, the tire pressure can be increased by utilizing one or more pulses of pressurized air to add pressurized air to the space 94. A pulse of air can be provided by placing the air supply conduit 40 in fluid communication with the first fluid control circuit 72 for a predetermined period of time and, at the end of the predetermined period of time, terminating fluid communication between the air supply conduit 40 and the first fluid control circuit 72. The air supply conduit 40 is in fluid communication with the first fluid control circuit 72 when the control valve assembly 32, supply valve assembly 34 and steer axle channel valve assembly 36 are in the open position. Utilizing one or more pulses of pressurized air to increase the tire pressure helps to prevent overinflation of the wheel assembly 88.

Once open, the wheel valve 86 can be maintained in the open position for one or more predetermined periods of time to increase the tire pressure to the target tire pressure. The wheel valve 86 can be maintained in the open position utilizing the bleed air. After the tire pressure has been increased to the target tire pressure, the wheel valve 86 is urged to the closed position.

After the tire pressure has been determined and/or increased to the target tire pressure, the tire inflation system 10 is vented. Preferably, the tire inflation system 10 is vented by venting one or more portions of the system. For example, it is preferably that the first fluid conduit 42, the first fluid control circuit 72 and the second fluid control circuit 74 are vented.

As described above, pressurized air from the first fluid conduit 42, the first fluid control circuit 72 and/or the second fluid control circuit 74 can be directed to the chamber 68 via the control valve assembly 32, steer axle channel valve assembly 36 and drive axle channel valve assembly 38, respectively. When it is desired to vent the tire inflation system 10, the control valve assembly 32, supply valve assembly 34, steer axle channel valve assembly 36 and drive axle channel valve assembly 38 are in the closed position. When the aforementioned valve assemblies 32, 34, 36, 38 are in the closed position, venting the first fluid conduit 42, the first fluid control circuit 72 and the second fluid control circuit 74 is enabled. If pressurized air is within the first fluid conduit 42, the first fluid control circuit 72 and the second fluid control circuit 74, the pressurized air is directed to the chamber 68 via the control valve assembly 32, steer axle channel valve assembly 36 and drive axle channel valve assembly 38, respectively. Preferably, pressurized air from the first fluid conduit 42, the first fluid control circuit 72 and the second fluid control circuit 74 is directed into chamber 68 from the control valve assembly 32, steer axle channel valve assembly 36 and drive axle channel valve assembly 38 from an opening 100 provided in a distal end of each valve assembly 32, 36, 38.

It should be appreciated that if dirt or debris enters the tire inflation system 10 and/or one or more of the valve assemblies 32, 36, 38 that it may cause portions of the tire inflation system 10 or one or more of the valve assemblies 32, 36, 38 to malfunction. However, as described above, the control valve assembly 32, steer axle channel valve assembly 36, and drive axle channel valve assembly 38 are each provided within the housing 14. Providing the valve assemblies 32, 36, 38 within the housing 14 is advantageous as it shields the openings 100 in the valve assemblies 32, 36, 38 from direct exposure to the environment which helps to prevent dirt and debris from entering the valve assemblies 32, 36, 38. Thus, the housing 14 and the location of the valve assemblies 32, 36, 38 therein helps to prevent the tire inflation system and/or one or more of the valve assemblies from malfunctioning.

The chamber 68 is in fluid communication with the atmosphere via the passage 66. The passage 66 extends from the chamber 68 to an outer surface 102 of the housing 14. After pressurized air is received from the first fluid conduit 42, the first fluid control circuit 70 and/or the second fluid control circuit 72, the passage 66 directs the pressurized air in the chamber 68 to the atmosphere. Preferably, the passage 66 is formed in the lower portion 22 of the housing 14 and extends in a downward direction. Forming the passage 66 in the lower portion 22 of the housing 14 and to extend in a downward direction helps to prevent dirt and debris from entering the housing 14.

In certain embodiments, a valve 104 is positioned in the passage 66. Preferably, the valve 104 is of the check valve variety. The valve 104 may be formed of rubber or another elastomeric material. In these embodiments, the valve 104 allows pressurized air in the chamber 68 to be discharged to the atmosphere and prevents air from the atmosphere from entering the chamber via the passage 66. Thus, the valve 104 helps to prevent dirt and debris from entering the housing 14 via the passage 66.

To determine when venting of the aforementioned portions of the tire inflation system 10 has been completed, the pressure sensor 26 measures the pressure of the air in the first fluid conduit 42, the first fluid control circuit 72 via the first fluid conduit 42, and the second fluid control circuit 74 via the first fluid conduit 42. It should be noted that when measuring the pressure of the air in the first fluid control circuit 72 or the second fluid control circuit 74, the steer axle channel valve assembly 36 and drive axle channel valve assembly 38 are in the open position, respectively. If the pressure of the air in the first fluid conduit 42 is measured to be equal to or approximately equal to normal atmospheric pressure, venting the first fluid conduit 42, first fluid control circuit 72 and second fluid control circuit 74 can be determined to be complete.

From the foregoing detailed description, it will be apparent that various modifications, additions, and other alternative embodiments are possible without departing from the true scope and spirit. The embodiments discussed herein were chosen and described to provide the best illustration of the principles of the invention and its practical application to thereby enable one of ordinary skill in the art to use the invention in various embodiments and with various modifications as are suited to the particular use contemplated. As should be appreciated, all such modifications and variations are within the scope of the invention.

What I claim is:

1. Method of venting a tire inflation system, comprising:
    providing a housing;
    providing a first valve assembly within the housing, the first valve assembly venting a first fluid conduit disposed within the housing;
    providing a second valve assembly which is attached to the first fluid conduit, wherein the second valve assembly provides fluid communication between the first fluid conduit and a first fluid control circuit when in an open position and vents the first fluid control circuit when in a closed position; and
    providing a third valve assembly within the housing, the third valve assembly being operable from an open position through a closed position for respectively promoting and prohibiting fluid flow from a source of pressurized fluid to the first fluid conduit.

2. The method of claim 1, further comprising directing a flow of pressurized air from the first fluid conduit and a flow of pressurized air from the first fluid control circuit into the housing.

3. The method of claim 1, wherein the second valve assembly is provided within the housing and at least a portion of the first fluid control circuit is provided outside of the housing.

4. The method of claim 1, wherein the first valve assembly is in fluid communication with a source of pressurized air.

5. The method of claim 1, wherein the first valve assembly is operable from an open position through a closed position.

6. The method of claim 1, wherein the second valve assembly is provided within in the housing and in the open position promotes fluid flow to one or more wheel assemblies via the first fluid control circuit.

7. The method of claim 1, further comprising providing a pressure sensor within the housing and in fluid communication with the first fluid conduit.

8. The method of claim 1, wherein the first fluid conduit and second valve assembly are in fluid communication.

9. The method of claim 1, wherein the housing comprises a chamber which is selectively in fluid communication with the first fluid conduit via the first valve assembly.

10. The method of claim 2, further comprising directing the pressurized air from the housing to atmosphere via a passage formed in the housing.

11. The method of claim 4, further comprising positioning the first valve assembly in an open position thereby enabling a flow of pressurized air to be directed to the first fluid conduit.

12. The method of claim 5, further comprising positioning the first valve assembly in the closed position and positioning the second valve assembly in the closed position thereby enabling venting of the first fluid conduit and the first fluid control circuit.

13. The method of claim 1, wherein the first valve assembly and the third valve assembly are in fluid communication via the first fluid conduit and an air supply conduit.

14. The method of claim 1, further comprising providing a fourth valve assembly within the housing, the fourth valve assembly attached to and in fluid communication with the first fluid conduit and operable from an open position through a closed position, for respectively promoting fluid flow to one or more wheel assemblies via a second fluid control circuit or venting the second fluid control circuit.

15. The method of claim 9, wherein the chamber is in fluid communication with the atmosphere via a passage formed in the housing.

16. The method of claim 10, wherein the passage is formed in a lower portion of the housing.

17. The method of claim 1, wherein the first valve assembly provides fluid communication between a source of pressurized air and the first fluid conduit when in an open position.

18. The method of claim 1, wherein the first valve assembly vents the first fluid conduit when in a closed position.

19. Method of venting a tire inflation system, comprising:
  providing a housing comprising a chamber which is in fluid communication with the atmosphere via a passage formed in a lower portion of the housing;
  providing a first valve assembly within the housing, the first valve assembly venting a first fluid conduit into the chamber, the first fluid conduit located within the housing and selectively in fluid communication with the chamber via the first valve assembly;
  providing a second valve assembly within the housing and attached to the first fluid conduit, the second valve assembly operable from an open position through a closed position, for respectively promoting fluid flow to one or more wheel assemblies via a first fluid control circuit or venting the first fluid control circuit into the chamber, wherein the second valve assembly provides fluid communication between the first fluid conduit and the first fluid control circuit when in the open position and vents the first fluid control circuit when in the closed position; and
  providing a third valve assembly within the housing, the third valve assembly operable from an open position through a closed position, for respectively promoting and prohibiting fluid flow from a source of pressurized fluid to the first fluid control circuit via the first fluid conduit.

20. The method of claim 19, wherein the first valve assembly, second valve assembly and third valve assembly are provided in the lower portion of the housing.

21. The method of claim 19, wherein at least a portion of the first fluid control circuit is provided outside of the housing.

\* \* \* \* \*